Patented May 2, 1950

2,505,833

UNITED STATES PATENT OFFICE 2,505,833

PRODUCTION OF SULFUR DIOXIDE-OLEFIN RESINS

Herman D. Noether, Kew Gardens, N. Y., and Ernest P. Irany, Cranford, N. J., assignors to Celanese Corporation of America, a corporation of Delaware No Drawing. Application November 14, 1945, Serial No. 628,668

13 Claims. (Cl. 260—79.3)

This invention relates to an improved process for the production of resinous materials by the reaction of sulfur dioxide with unsaturated hydrocarbons containing an olefinic linkage.

An object of this invention is the provision of an improved process for the production of resinous materials of high molecular weight by reacting sulfur dioxide with an unsaturated hydrocarbon containing an olefinic linkage.

Another object of this invention is the production of resinous materials of improved physical and chemical characteristics by reacting at relatively low temperatures sulfur dioxide with an unsaturated hydrocarbon containing an olefinic linkage.

Other objects of this invention will appear from the following detailed description.

Resinous materials which are the reaction products of sulfur dioxide with unsaturated olefinic hydrocarbons have heretofore been prepared by employing certain catalysts to aid in the polymerization, or by causing the reaction to take place in the presence of sunlight or some other source of actinic rays having a catalytic effect on the reaction. The lower the temperature at which the polymerization reaction was carried out, the more satisfactory were the products obtained; the low polymerization temperatures favoring the formation of polymerization products of higher molecular weight and improved physical and chemical properties. Moreover, for the best results, it was necessary to add catalysts, e. g. organic peroxides, organic and inorganic nitrates, etc., of sufficient solubility in the reaction mixture so that they will be present in sufficient concentration to exert a maximum catalytic action. The low temperature catalytic polymerization, employing catalysts such as those mentioned above, has not proven to be entirely feasible. For example, at relatively low temperatures the inorganic nitrates become insoluble in the mixture of sulfur dioxide and unsaturated olefinic hydrocarbon undergoing reaction and do not exhibit the desired catalytic action. While the ordinary organic peroxide catalysts usually remain soluble, they become too stable at the low temperatures to be catalytically active. The use of the above type of catalysts has also led to contamination and discoloration of the polymer product obtained.

We have now found that polymers of high molecular weight and of improved physical and chemical properties may be obtained at low temperatures by polymerizing sulfur dioxide and a hydrocarbon containing an unsaturated olefinic linkage without employing catalysts of the above type. In accordance with the novel process of our invention, we introduce oxygen into the unsaturated olefinic hydrocarbon and, after removing uncombined oxygen therefrom, react said unsaturated olefinic hydrocarbon with sulfur dioxide at a low temperature under atmospheric pressure, or under pressures above or below atmospheric pressure. Optimum results are obtained employing reaction temperatures of about —20° C. to about 5° C. Since liquid sulfur dioxide boils at —10° C. and may form azeotropic mixtures with the unsaturated hydrocarbons employed, which mixtures may boil at even lower temperatures than —10° C., pressures above atmospheric are necessary where reaction temperatures higher than the normal atmospheric boiling point are desired. Such higher reaction temperatures may be desirable in some instances for the purpose of increasing the speed of the polymerization reaction where it is found that said reaction is too slow to be commercially feasible at the normal boiling point of the mixture. Temperatures lower than the normal boiling point of the mixture may also be employed by conducting the reaction at pressures below normal atmospheric pressure. As stated, however, we have found that the most desirable results are achieved at polymerization temperatures no higher than about 5° C. While we believe that the combined oxygen forms a peroxide type of linkage with the unsaturated olefinic compound, which compound then acts to catalyze the polymerization reaction, this is merely a theoretical view of the nature of the reaction involved and we do not wish to be bound thereby.

The oxygen may be introduced into the unsaturated olefinic hydrocarbon by passing a stream of oxygen or air through said compound or by distilling the unsaturated olefinic compound in the presence of air or oxygen. Uncombined oxygen may then be removed by bubbling a stream of oxygen-free nitrogen or other oxygen-free inert gas through the unsaturated olefinic hydrocarbon or by permitting the latter to reflux whereby the uncombined oxygen is expelled. The unsaturated olefinic hydrocarbon may then be mixed with the desired quantity of sulfur dioxide and the polymerization effected at low temperature.

The oxygen may also be introduced into the mixture of the unsaturated olefinic hydrocarbon and the desired quantity of sulfur dioxide by passing air or oxygen through the mixture or by distilling the mixture in the presence of air or oxygen. Again, uncombined oxygen may be removed from the mixture by passing a stream of oxygen-free nitrogen or other oxygen-free inert gas through the mixture or by allowing it to reflux for a time sufficient to expel the uncombined oxygen. After uncombined oxygen has been removed, the desired polymerization takes place.

In order to effect the desired polymerization, it is of importance that the uncombined oxygen be removed. Contrary to what the art has previously taught, we have found that at low temperatures uncombined oxygen, when present in a mixture of sulfur dioxide and an unsaturated olefinic hydrocarbon, does not have any catalytic effect. Instead, the uncombined oxygen actually has a strong inhibiting action on the polymerization process at low temperatures and, therefore, must be removed prior to polymerization.

The mol ratio of sulfur dioxide to unsaturated organic olefinic compound in the reaction mixture may vary. The most desirable results are obtained, however, where from one mol or more of sulfur dioxide is present in the reaction mixture for each mol of unsaturated olefinic hydrocarbon present. One mol of sulfur dioxide will react with one mol of the hydrocarbon. Any additional mols of sulfur dioxide employed merely serve as a solvent for the resultant resin. We prefer, for example, to use about 10 mols of sulfur dioxide, so that the resulting polymer will remain in solution in the excess liquid sulfur dioxide which is later removed.

The refluxing of the reaction mixture to remove uncombined oxygen is advantageously carried out at relatively low temperatures also, e. g. at temperatures of about −20° C. up to about 10° C. Precise control of the temperature may be achieved by controlling the pressure under which the mixture is refluxed.

The resinous polymerization products are precipitated from the solution in which they are formed by adding the solution to an excess of methanol, water or other non-solvent. The precipitated resinous materials are filtered off and may be employed in molding operations at temperatures of 120° C. to 350° C. and pressures of 1000 to 3000 pounds per square inch.

Various unsaturated olefinic hydrocarbons and mixtures of the same may be employed in the formation of resinous compounds in accordance with our novel process. As examples of the unsaturated olefinic compounds which may be reacted to form resinous polymerization products with sulfur dioxide by our novel process, there may be mentioned butene-2, butene-1, isobutene, and higher homologs, such as pentene-1 and pentene-2.

In order further to illustrate our invention, but without being limited thereto, the following examples are given:

Example I

A mixture of 10 mols of sulfur dioxide and 1 mol of butene-2 collected or prepared under anaerobic conditions (in the absence of oxygen), is refluxed at its azeotropic boiling point of about −13° C. and a stream of air is then passed through the refluxing mixture for about one hour. The flow of air is then halted. No polymerization is observed after the treated mixture stands for five hours. When the mixture is refluxed for about one hour at the same temperature so that all of the uncombined oxygen is removed, polymerization starts and proceeds very rapidly. The resinous polymer produced is precipitated from solution by adding the latter to an excess of methanol. The resinous polymer precipitated is of a relatively high molecular weight.

Example II

Butene-2 is distilled in an air stream and 1 mol of this aerated butene-2 is dissolved in 10 mols of liquid sulfur dioxide at −16° C. At this low temperature the liquid mixture does not boil and consequently any excess of oxygen is not removed or expelled. Hence, substantially no polymerization takes place at this temperature even after 15 hours. When the temperature of the mixture is raised to about −12° C. so that it begins to boil or reflux and oxygen is expelled, polymerization begins to take place very rapidly within a short time, such as one hour, and resinous polymerization products of relatively high molecular weight are obtained. The resinous polymerization products are precipitated from solution by adding the solution in which they are formed to an excess of methanol.

Example III

A mixture of butene-2 and sulfur dioxide is prepared in accordance with the process of Example II and refluxed at about −12° C. directly for one half hour to remove uncombined oxygen. When the uncombined oxygen is expelled the mixture is then immediately coiled to −16° C. and polymerization, which started during the refluxing, continues very rapidly even at this low temperature. Separation of the resin formed is effected by adding the reaction mixture to an excess of methanol whereby the resin precipitates.

Example IV

A mixture of 10 mols of liquid sulfur dioxide and 1 mol of butene-2 is aerated by passing a stream of air or oxygen through it for about one hour. The mixture is then refluxed under atmospheric pressure for one hour at a temperature of −12° C. When the uncombined oxygen is removed, polymerization takes place very vigorously. Precipitation and separation of the resin formed is effected as described above. When butene-1 is employed in lieu of butene-2 in the process described above, a resin of equally satisfactory properties is obtained.

Example V

An aerated mixture of butene-2 and sulfur dioxide, prepared as an Example IV, is refluxed at −20° C. under reduced pressure for about two hours. Polymerization starts quite vigorously during refluxing and the completion of polymerization yields polymerization products of high molecular weight. The precipitation and separation of the polymerization product obtained is effected as described above.

Example VI

The uncombined oxygen is expelled from a mixture of sulfur dioxide and butene-2, prepared in accordance with Example IV by passing a stream of nitrogen through the mixture while the latter is maintained at −18° C. Polymerization starts quite vigorously within 2 hours with the production of high molecular weight polymers. The polymerization product is precipitated by adding the reaction solution to an excess of water.

Example VII 4 mols of sulfur dioxide are mixed with 1 mol of butene-2 and the mixture is aerated by passing a stream of air or oxygen through it for about one hour. The mixture is refluxed under atmospheric pressure for one hour to remove uncombined oxygen and polymerization then proceeds quite vigorously. The resinous polymerization product is precipitated as described above.

*Example VIII*

A mixture of 8 mols of sulfur dioxide and 1 mol of pentene-1, each distilled in an atmosphere of nitrogen, is aerated by passing a stream of air through the mixture for two hours. The mixture is then refluxed at —5° C. to expel uncombined oxygen and polymerization then takes place on continued refluxing at —5° C. yielding an excellent resin which may be precipitated from solution as described. Without aeration no polymerization is observed to take place even after the mixture stands for several hours.

It is to be understood that the foregoing detailed description is given merely by way of illustration and that many variations may be made therein without departing from the spirit of our invention.

Having described our invention, what we desire to secure by Letters Patent is:

1. Process for the production of resinous reaction products, which comprises introducing gaseous oxygen into an unsaturated liquid hydrocarbon containing an olefinic linkage and free from other unsaturated linkages in an amount in excess of that required to form a catalytic amount of the peroxide of the hydrocarbon, physically removing such excess of oxygen from the hydrocarbon so treated and reacting said oxygen-treated hydrocarbon with liquid sulfur dioxide.

2. Process for the production of resinous reaction products, which comprises introducing gaseous oxygen into an unsaturated liquid hydrocarbon containing an olefinic linkage and free from other unsaturated linkages in an amount in excess of that required to form a catalytic amount of the peroxide of the hydrocarbon by passing an oxygen-containing gas through said hydrocarbon, physically removing such excess of oxygen from the hydrocarbon so treated, and reacting said oxygen-treated hydrocarbon with liquid sulfur dioxide.

3. Process for the production of resinous reaction products, which comprises introducing gaseous oxygen into an unsaturated liquid hydrocarbon containing an olefinic linkage and free from other unsaturated linkages in an amount in excess of that required to form a catalytic amount of the peroxide of the hydrocarbon by passing an oxygen-containing gas through said hydrocarbon, physically removing such excess of oxygen from the hydrocarbon so treated by passing an inert-oxygen-free gas therethrough, and reacting said oxygen-treated hydrocarbon with liquid sulfur dioxide.

4. Process for the production of resinous reaction products, which comprises introducing gaseous oxygen into an unsaturated liquid hydrocarbon containing an olefinic linkage and free from other unsaturated linkages in an amount in excess of that required to form a catalytic amount of the peroxide of the hydrocarbon by passing an oxygen-containing gas through said hydrocarbon, physically removing such excess of oxygen from the hydrocarbon so treated by refluxing said oxygen-treated hydrocarbon, and reacting said hydrocarbon with liquid sulfur dioxide.

5. Process for the production of resinous reaction products, which comprises introducing gaseous oxygen into a mixture of liquid sulfur dioxide and an unsaturated liquid hydrocarbon containing an olefinic linkage and free from other unsaturated linkages in an amount in excess of that required to form a catalytic amount of the peroxide of the hydrocarbon, physically removing such excess of oxygen and effecting reaction between the sulfur dioxide and the hydrocarbon.

6. Process for the production of resinous reaction products, which comprises introducing gaseous oxygen into a mixture of liquid sulfur dioxide and an unsaturated liquid hydrocarbon containing an olefinic linkage and free from other unsaturated linkages in an amount in excess of that required to form a catalytic amount of the peroxide of the hydrocarbon, physically removing such excess of oxygen by passing an inert gas through the mixture and effecting reaction between the sulfur dioxide and hydrocarbon.

7. Process for the production of resinous reaction products, which comprises introducing gaseous oxygen into a mixture of liquid sulfur dioxide and an unsaturated liquid hydrocarbon containing an olefinic linkage and free from other unsaturated linkages in an amount in excess of that required to form a catalytic amount of the peroxide of the hydrocarbon, physically removing such excess of oxygen by refluxing said mixture and effecting reaction between the sulfur dioxide and hydrocarbon.

8. Process for the production of resinous reaction products, which comprises introducing gaseous oxygen into liquid butene-2 by passing an oxygen-containing gas through said butene-2 in an amount in excess of that required to form a catalytic amount of the peroxide of the butene-2, physically removing such excess of oxygen from the butene-2, and reacting the oxygen-treated butene-2 with sulfur dioxide at a temperature of at most the boiling point of the reaction mixture formed.

9. Process for the production of resinous reaction products, which comprises introducing gaseous oxygen into a mixture of liquid butene-2 and sulfur dioxide by passing an oxygen-containing gas through the mixture in an amount in excess of that required to form a catalytic amount of the peroxide of the butene-2, physically removing such excess of oxygen from the mixture, and effecting reaction between the sulfur dioxide and butene-2 at a temperature of at most the boiling point of the reaction mixture formed.

10. Process for the production of resinous reaction products, which comprises introducing gaseous oxygen into a mixture of liquid butene-2 and sulfur dioxide by passing an oxygen-containing gas through the mixture in an amount in excess of that required to form a catalytic amount of the peroxide of the butene-2, physically removing such excess of oxygen from the mixture by passing an inert, oxygen-free gas through the mixture, and effecting reaction between the sulfur dioxide and butene-2 at a temperature of at most the boiling point of the reaction mixture formed.

11. Process for the production of resinous reaction products, which comprises introducing gaseous oxygen into a mixture of liquid butene-2 and sulfur dioxide by passing an oxygen-containing gas through the mixture in an amount in excess of that required to form a catalytic amount of the peroxide of the butene-2, physically removing such excess of oxygen from the mixture by refluxing the latter, and effecting reaction between the sulfur dioxide and butene-2 at a temperature of at most the boiling point of the reaction mixture formed.

12. Process for the production of resinous reaction products, which comprises introducing gaseous oxygen into a mixture of butene-2 and sulfur dioxide containing at least one mol of sulfur dioxide for each mol of butene-2 by passing an oxygen-containing gas through the mixture in an amount in excess of that required to form a catalytic amount of the peroxide of the butene-2, physically removing such excess of oxygen from the mixture by passing an inert, oxygen-free gas through the mixture, and effecting reaction between the sulfur dioxide and butene-2 at a temperature of at most the boiling point of the reaction mixture formed.

13. Process for the production of resinous reaction products, which comprises introducing gaseous oxygen into a mixture of butene-2 and sulfur dioxide containing at least one mol of sulfur dioxide for each mol of butene-2 by passing an oxygen-containing gas through the mixture in an amount in excess of that required to form a catalytic amount of the peroxide of the butene-2, physically removing such excess of oxygen from the mixture by refluxing the latter, and effecting reaction between the sulfur dioxide and butene-2 at a temperature of at most the boiling point of the reaction mixture formed.

HERMAN D. NOETHER.
ERNEST P. IRANY.

REFERENCES CITED

The following references are of record in the file of this patent:

Seyer et al.: J. Am. Chem. Soc., 55, 3140–3149 (1933).

Snow et al.: Ind. Eng. Chem., 30, 176–181 (1938).